(12) United States Patent
Kuipers et al.

(10) Patent No.: US 9,362,959 B2
(45) Date of Patent: Jun. 7, 2016

(54) DATA PROCESSING IN A DIGITAL SUBSCRIBER LINE ENVIRONMENT

(71) Applicant: Adtran Inc., Huntsville, AL (US)

(72) Inventors: Martin Kuipers, Dallgow-Döberitz (DE); Daniel M. Joffe, Owens Crossroads, AL (US); Kevin W. Schneider, Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 26 days.

(21) Appl. No.: 14/270,047

(22) Filed: May 5, 2014

(65) Prior Publication Data

US 2015/0318875 A1 Nov. 5, 2015

(51) Int. Cl.
*H04B 1/00* (2006.01)
*H04L 5/08* (2006.01)
*H04B 3/32* (2006.01)
*H04M 11/06* (2006.01)

(52) U.S. Cl.
CPC .............. *H04B 1/0057* (2013.01); *H04B 3/32* (2013.01); *H04L 5/08* (2013.01); *H04M 11/062* (2013.01)

(58) Field of Classification Search
None
See application file for complete search history.

(56) References Cited

U.S. PATENT DOCUMENTS

| | | | |
|---|---|---|---|
| 6,304,578 B1 * | 10/2001 | Fluss | H04L 12/2801 348/E7.063 |
| 2002/0105964 A1 * | 8/2002 | Sommer | H04L 25/24 370/463 |
| 2003/0108035 A1 * | 6/2003 | Langberg | H04L 12/66 370/352 |
| 2006/0233352 A1 * | 10/2006 | Ploumen | H04L 29/06027 379/399.01 |
| 2007/0116056 A1 * | 5/2007 | Cruz | H04M 11/062 370/487 |
| 2007/0263778 A1 * | 11/2007 | Aydin | H04M 3/08 379/9.02 |
| 2009/0285271 A1 * | 11/2009 | Perez De Aranda Alonso | H04L 25/03133 375/219 |
| 2009/0285274 A1 * | 11/2009 | Shiue | H04L 25/03019 375/224 |
| 2014/0307749 A1 * | 10/2014 | Liang | H04L 27/2601 370/509 |

OTHER PUBLICATIONS

"Understand DSLAM and BRAS Access Devices" white paper, Agilent Technologies, Aug. 2006, p. 4.*

* cited by examiner

*Primary Examiner* — Andrew Lai
*Assistant Examiner* — Jamaal Henson
(74) *Attorney, Agent, or Firm* — Fish & Richardson P.C.

(57) ABSTRACT

A device is suggested comprising a first DSL system operating in a first frequency band, a second DSL system operating in a second frequency band and a filter unit connected to a line and to each of the first DSL system and the second DSL system.

34 Claims, 5 Drawing Sheets

DATA PROCESSING IN A DIGITAL SUBSCRIBER LINE ENVIRONMENT

BACKGROUND OF THE INVENTION

Embodiments of the present invention relate to data processing in a digital subscriber line environment.

DSL (or xDSL) is directed to a family of technologies that provide digital data transmission over the wires of a local telephone network.

SUMMARY

A first embodiment relates to a device comprising
a first DSL system operating in a first frequency band;
a second DSL system operating in a second frequency band; and
a filter unit connected to a line and to each of the first DSL system and the second DSL system.

A second embodiment relates to a method comprising
conveying first data via a first DSL system across a line;
conveying second data via a second DSL system across the line.

A third embodiment relates to a filtering unit comprising
a first filter that is arranged for conveying first data via a first DSL system across a line;
a second filter that is arranged for conveying second data via a second DSL system across the line.

A fourth embodiment is directed to a device comprising
a first DSL system;
a second DSL system;
a processing unit that is arranged for
conveying first data via the first DSL system across a line;
conveying second data via the second DSL system across the line.

A fifth embodiment relates to a system comprising two devices as described herein, wherein the system is arranged to convey first data between the first DSL systems of the two devices and to convey data between the second DSL systems of the two devices across a single line.

A sixth embodiment is directed to a device for data processing in a digital subscriber line environment comprising
means for conveying first data via a first DSL system across a line;
means for conveying second data via a second DSL system across the line.

A seventh embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Examples described in particular refer to at least one DSL system according to an available definition (e.g., standard) or it may be based on such definition. A DSL system may conduct a handshake process (e.g., based on ITU-T G.994.1) then conduct an initialization, which—when successfully completed—results in entering showtime. When in showtime, payload data can be conveyed via the DSL system. Hence, showtime is a state that is reached after the initialization procedure has been completed.

The handshake process described herein may be a handshake process according to, e.g., ITU-T G.994.1, G.hn or it may be an adapted handshake process.

In such adapted handshake process, a handshake information of a second DSL system may be conveyed via a first DSL system. This approach allows for conducting a handshake for the second system. This handshake may be an adapted (or modified) handshake compared to the handshake according to G.994.1. The first system may be a low-frequency (LF) system and the second system may be a high frequency (HF) system. This, however, is only an option and the first and second systems may utilize frequency bands without such limitation. Such approach bears the advantage that the handshake of the second system does not require sending tones that fall in the range of the first frequency band and avoids any disturbance of the first system by the second system. Also, the solution presented allows the adapted handshake to be fast, because the infrastructure of the first system may be used.

Example

Two xDSL Systems Using a Single Line Connecting a DSLAM and a CPE

Figure 1:
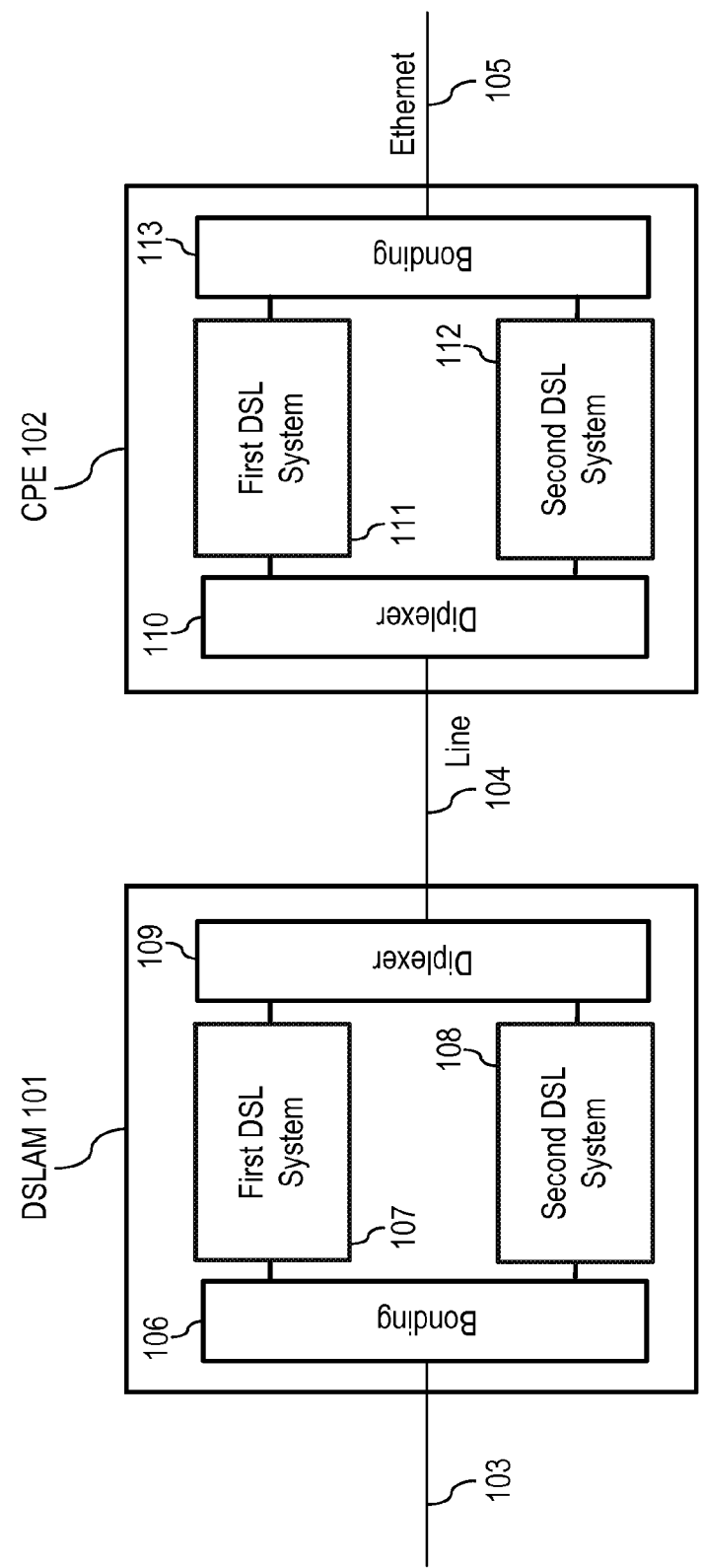
FIG. 1 shows a schematic block diagram comprising two exemplary network elements, i.e. a DSLAM and a CPE, which are connected via a line, wherein each of the network element comprises several DSL systems that utilize said line.

FIG. 1 shows a schematic block diagram comprising two exemplary network elements, i.e. a DSLAM 101 and a CPE 102, which are connected via a line 104. An Ethernet connection 103 is fed to a bonding unit 106 of the DSLAM 101, to which a first DSL system 107 and a second DSL system 108 are connected. The first DSL system 107 and the second DSL system 108 are connected to the line 104 via a diplexer 109. The line 104 is connected to a diplexer 110 of the CPE 102, to which a first DSL system 111 and second DSL system 112 are connected. The first DSL system 111 and the second DSL system 112 are connected to an Ethernet connection 105 via a bonding unit 113.

It is noted that the Ethernet connection 103 may be supplied via an optical fiber; in such scenario, an optical signal conveyed via said fiber may be fed to a central card that is connected via a backplane to a line card. The central card may convert the optical signal into an electrical signal for processing at the line card. In the opposite direction, the electrical signal is conveyed via the line card to the central card, converted to the optical signal and transmitted via the fiber.

The bonding unit may comprise a bonding function that may (at least partially) be implemented on the line card, on the central card or separate to the DSLAM or the CPE, e.g., within the network to which the Ethernet connection 103 may be connected.

In this example, only two DSL systems are shown per network element. The approach may, however, use more than two DSL systems utilizing the line 104. The first DSL system 107, 111 may each comprise a low-frequency (LF) transceiver and the second DSL system 108, 112 may each comprise a high-frequency (HF) transceiver. However, the first DSL systems 107, 111 and the second DSL systems 108, 112 may utilize the same type of DSL technology.

As an example, the LF transceivers may be VDSL2 profile 17a transceivers. The HF transceivers may be any transceiver utilizing a frequency band above 17.6 MHz (e.g., VDSL2 profile 30a transceivers with a high pass band plan or G.fast transceivers). G.fast may be based on, e.g., ITU-T G.9700 and/or G.9701.

Figure 2:
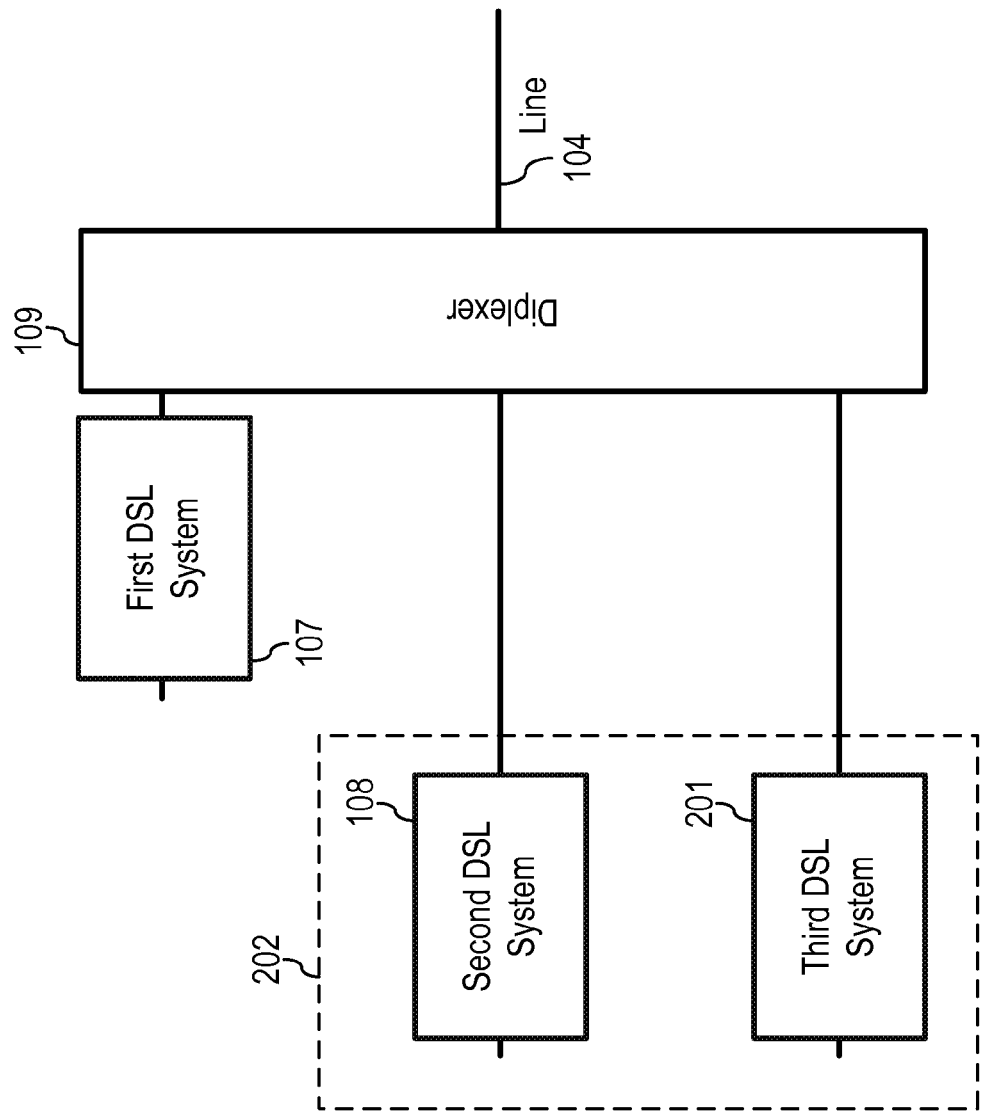
FIG. 2 shows an alternative example based on FIG. 1, wherein an integrated service may supply a data rate utilizing the second DSL system and a third DSL system.

FIG. 2 shows an alternative example based on FIG. 1, wherein an integrated service 202 may supply a data rate utilizing the second DSL system 108 and a third DSL system 201. The first DSL system 107 may be run by a different provider and/or for a different subscriber. In this example, the DSL systems 107, 108 and 201 use the same line 104, i.e. convey data across this line 104.

It is noted that conveying data across the line 104 may be achieved by utilizing at least one of the following multiplexing schemes: Frequency-division multiplexing (FDM), time-division multiplexing (TDM), or code division multiplexing (CDM). It is further noted that combined multiplexing schemes may be applied as well.

Example

Network Element with Diplexer

Figure 3:
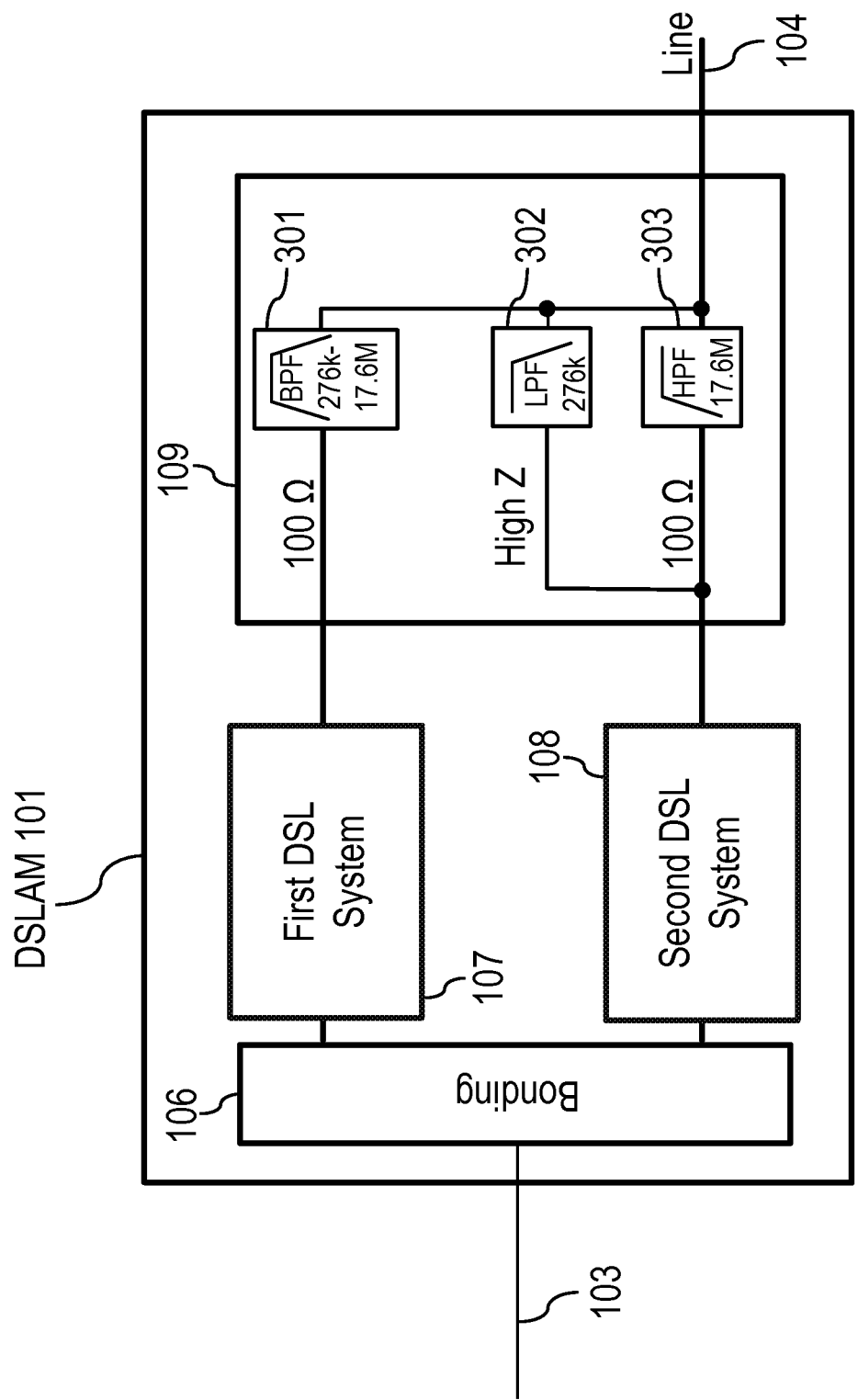
FIG. 3 shows the an exemplary implementation of the DSLAM based on FIG. 1, wherein the diplexer comprises a band-pass filter, a low-pass filter and a high pass filter.

FIG. 3 shows an exemplary implementation of the DSLAM 101 based on FIG. 1, wherein the diplexer 109 comprises a band-pass filter 301, a low-pass filter 302 and a high pass filter 303. In the example shown in FIG. 3, the first DSL system 107 may comprise a VDSL2 transceiver according to ITU-T G.993.2 profile 17a (also referred to as LF transceiver) and the second DSL system 108 may comprise a VDSL2 transceiver according to ITU-T G993.2 profile 30a (also referred to as HF transceiver). The LF transceiver may utilize handshake tones according to the carrier set designation V43 as defined in ITU-T G.994.1 (table 1, version 6/2012). The HF transceiver may use handshake tone sets below 276 kHz (A43).

The LF transceiver uses VDSL2 profile 17a with one of the known band plans up to a frequency of 17.6 MHz. The handshake tones according to V43 lie within the used transmission bands. The LF transceiver may be configured such that it does not use the upstream frequency band US0. For the band plan configured (998ADE17-M2x-B) there is no downstream transmission below a frequency of 276 kHz and the downstream frequency band DS1 starts above this frequency. By having freed this part of the frequency band (below 276 kHz) some frequency space is available for the handshake process of the HF transceiver. The highest frequency used by the tone set A43 amounts to 276 kHz, which may be applied by the HF transceiver, still lies beyond the frequencies used for transmission of the profile 30a system and does not overlap with the LF system.

Therefore, the A43 handshake tones can be used by the HF DSL system 108 via the low-pass filter 302 (with a cutoff frequency of 276 kHz). The LF DSL system 107 may use the band-pass filter 301 (allowing a frequency band from 276 kHz to 17.6 MHz). The HF DSL system 108 may use the high-pass filter 303 with a cutoff frequency of 17.6 MHz.

Hence, this solution shows an exemplary embodiment as how the first DSL system 107 and the second DSL system 108 may use the single line 104 for conveying data, including data that is required for conducting the respective handshake process.

Example

Filter Structure

The VDSL profile 17a system uses frequencies up to 17 MHz. A G.hn system (based on, e.g., ITU-T G.9960) uses frequencies above 17 MHz.

Figure 4:
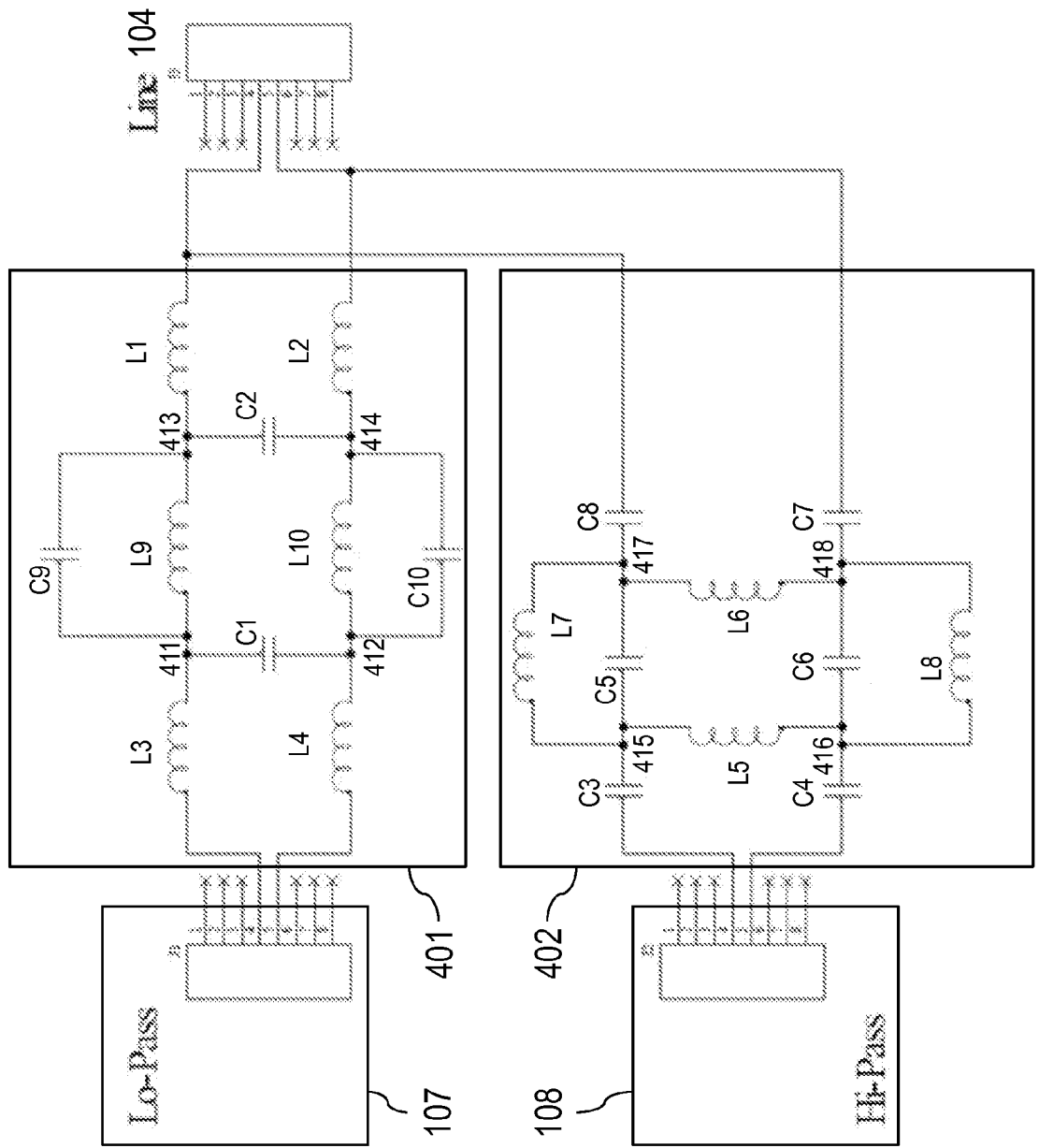
FIG. 4 shows an exemplary embodiment for a diplexer that allows two DSL systems modems to be combined to convey data across a single line (single wire pair)

FIG. 4 shows an exemplary embodiment for a diplexer that allows both DSL systems modems to be combined to convey data across a single line (single wire pair). The diplexer of FIG. 4 comprises a first filter 401 for the first DSL system 107 and a second filter 402 for the second DSL system 108.

The diplexer may create two independent paths, a low-pass path (via the filter 401) and a high-pass path (via the filter 402), separated at 17 MHz. The transition band between those paths may be (ideally: infinitely) narrow, thereby maximizing the bandwidth for each path.

FIG. 4 in particular shows an exemplary diplexer utilizing filters of 5th or 6th order. The 6th order design populates the no-load components inductors L7 and L8, and capacitors C9, and C10, whose inclusion has the effect of steepening the cutoff transition band, thereby improving the diplexer's performance.

A first terminal of the DSL system 107 is connected via an inductor L3 to a node 411. A second terminal of the DSL system 107 is connected via an inductor L4 to a node 412. The node 411 is connected with the node 412 via a capacitor C1. The node 411 is connected via an inductor L9 to a node 413, wherein a capacitor C9 is connected in parallel to the inductor L9. The node 412 is connected via an inductor L10 to a node 414, wherein a capacitor C10 is connected in parallel to the inductor L10. The node 413 is connected to the node 414 via a capacitor C2. The node 413 is connected to a first wire of the line 104 via an inductor L1 and the node 414 is connected to a second wire of the line 104 via an inductor L2.

A first terminal of the DSL system 108 is connected via a capacitor C3 to a node 415. A second terminal of the DSL system 108 is connected via a capacitor C4 to a node 416. The node 415 is connected with the node 416 via an inductor L5. The node 415 is connected via a capacitor C5 to a node 417, wherein an inductor L7 is connected in parallel to the capacitor C5. The node 416 is connected via a capacitor C6 to a node 418, wherein an inductor L8 is connected in parallel to the capacitor C6. The node 417 is connected to the node 418 via an inductor L6. The node 417 is connected to the first wire of the line 104 via a capacitor C8 and the node 418 is connected to the second wire of the line 104 via a capacitor C7.

The capacitors and inductors shown in FIG. 4 may be dimensioned as follows: C1=C2=150 pF; C3 to C8=270 pF; C9=C10=100 pF; L1 to L6=270 nH; L7 to L10=470 nH.

Example

Vectoring Structure

Figure 5:
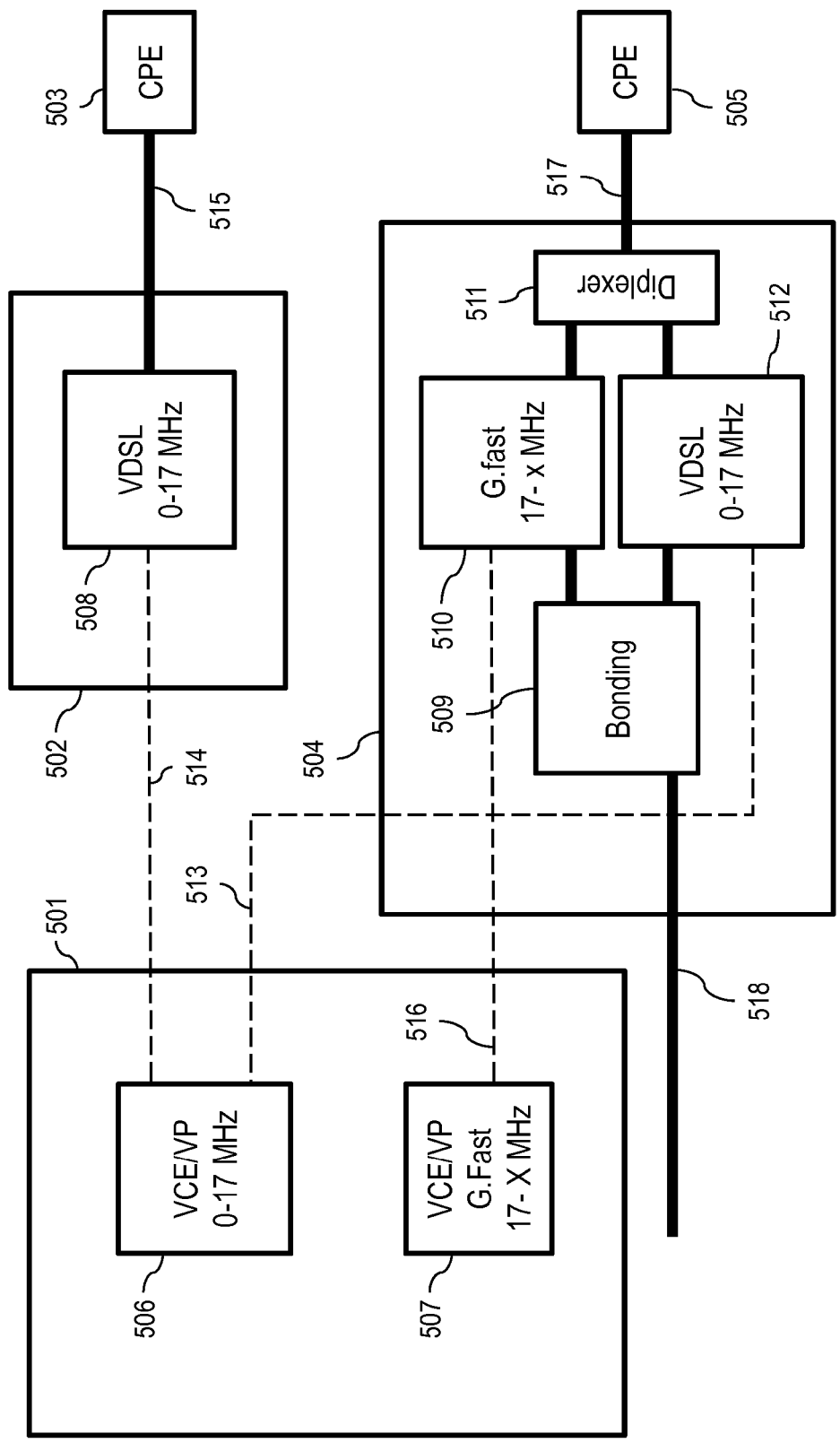
FIG. 5 shows an exemplary architecture comprising a system level vectoring (SLV) resource card and two line cards.

FIG. 5 shows an exemplary architecture comprising a system level vectoring (SLV) resource card 501, a line card 502 and a line card 504.

The line card 502 comprises a DSL system 508, which is connected to a CPE 503 via a line 515. The DSL system 508 is a VDSL system utilizing a frequency range from 0 to 17 MHz. Also, the DSL system 508 may be connected to an Ethernet connection, which is not shown in FIG. 5.

The line card 504 comprises a DSL system 510, which is a G.fast DSL system utilizing a frequency range from 17 MHz up to a frequency of, e.g., 106 MHz, and a DSL system 512, which is a VDSL system utilizing a frequency range from 0 to 17 MHz. The line card 504 further comprises a bonding unit 509 that is connected to an Ethernet connection 518 and to the DSL systems 510 and 512. The bonding unit 509 supplies a data multiplexing and/or bonding function between the Ethernet connection 518 and the DSL systems 510 and 512. The line card 504 also comprises a filter unit 511, which may be realized as a diplexer. The filter unit 511 is connected to the DSL systems 510 and 512 and to a line 517 to which a CPE 505 is connected.

The SLV resource card 501 comprises a vectoring control entity (VCE) and a vectoring processor (VP) collectively indicated as VCE/VP 506 for the DSL systems 508 and 512 (VDSL systems) and a VCE/VP 507 for the DSL system 510 (G.fast DSL system). The VCE/VP 506, 507 may be implemented based on ITU-T G.993.2 in combination with G.993.5 and/or G.9701. The vectoring processor may be realized as an ASIC, FPGA, microprocessor, or the like.

The VCE/VP 506 is connected to the DSL system 508 via a connection 514 and to the DSL-System 512 via a connection 513. The VCE/VP 507 is connected to the DSL system 510 via a connection 516. The connections 513, 514 and 516 are used for conveying vectoring information between the DSL systems 508, 510 and 512 and the SLV resource card 501. In FIG. 5, connections carrying vectoring information are shown as dashed lines and connections carrying data (e.g., payload) are visualized as thick continuous lines.

The example shown in FIG. 5 enables a premium service to be provided via the line card 504 by combining two DSL systems 510 and 512. The SLV resource card 501 may advantageously be used for several line cards.

The bonding unit may utilize "Ethernet in the First Mile" according to or based on IEEE P802.3ah bonding, link aggregation based on IEEE 802.3ad, G.bond according to G.998.x, ATM (Asynchronous Transfer Mode) bonding or PTM (Packet Transfer Mode) bonding, or Layer 3 techniques such as equal cost multipath routing or other load sharing techniques.

According to the architecture shown in FIG. 5, an extended frequency operation may be utilized that is compatible with already deployed vectored VDSL2 profile 17 equipment (i.e. said VDSL systems 508 and 512). Without disturbing VDSL2 vectoring by alien crosstalk, frequency division multiplexing of G.fast and VDSL2 profile 17 can be used on the same line by bonding the payloads.

It is an option that the line card 504 supplies the DSL systems via a digital signal processor (DSP), which may increase integration density. It may also be an option to integrate the DSL systems 510, 512 and also (at least partially) the filter function 511 in a single device.

The examples suggested herein may in particular be based on at least one of the following solutions. In particular combinations of the following features could be utilized in order to reach a desired result. The features of the method could be combined with any feature(s) of the device, apparatus or system or vice versa.

A device is suggested, said device comprising
a first DSL system operating in a first frequency band;
a second DSL system operating in a second frequency band; and
a filter unit connected to a line and to each of the first DSL system and the second DSL system.

Hence, such device may be utilized for conveying data (e.g. payload and/or control data) of at least two different DSL systems via a single (DSL) line.

Each DSL system (also referred to as xDSL system or (x)DSL technology) may in particular comprise a transceiver for transmitting and/or receiving data according to or based on a DSL standard. Different or same DSL standards may be used for the first DSL system and for the second DSL system.

Said line may be a connection between two network elements, e.g., a DSLAM or central office (CO) and a customer premises equipment (CPE). In particular one of the network elements may be a centralized network element and the other network element may be a decentralized network element. The line may in particular be a two-wire connection or cable (single wire pair).

The first data may be data that is conveyed utilizing said first DSL technology and the second data may be data that is conveyed utilizing said second DSL technology. The first and/or the second data may each in particular be or comprise payload data or signaling data or any information that is conveyed by the respective DSL technology.

Hence, advantageously, several DSL technologies may utilize a single line. For example, several data streams that are coded using several DSL systems may be conveyed across such a line.

In an embodiment, said device is a digital subscriber line access multiplexer.

In an embodiment, the first DSL system is a vectored DSL system.

In an embodiment, the second DSL system is a vectored DSL system.

In an embodiment, the second frequency band is not overlapping with the first frequency band.

In an embodiment, the further comprises a bonding unit for receiving and transmitting packets and connected to each of the first DSL system and the second DSL system.

In an embodiment, the bonding unit is arranged to distribute packets onto at least two channels, wherein each DSL system provides at least one channel.

Such channel may in particular be any logical channel for transmitting data.

In an embodiment, the filter unit comprises a diplexer.

In an embodiment, the filter unit comprises at least one filter, which combines signals from the first DSL system and the second DSL system onto the line and separates signals for the first DSL system and the second DSL system.

In an embodiment, the line comprises a copper line cable, an aluminum cable or an electrical wire. The electrical wire may in particular comprise a pair of wires.

A method is provided, said method comprising
conveying first data via a first DSL system across a line;
conveying second data via a second DSL system across the line.

In an embodiment, the method further comprises
conveying additional data via at least one additional DSL system across the line.

Hence, the examples described herein are not limited to two DSL systems. In fact, a multitude of DSL systems may utilize the line.

In an embodiment, the first data and the second data are multiplexed across the line.

Such multiplexing may be directed to at least one of the following: a time domain, a frequency domain, a code domain and/or a space domain. Hence, at least one of the following variations of multiplexing may be utilized: Space-division multiplexing (SDM), frequency-division multiplexing (FDM), time-division multiplexing (TDM), or code division multiplexing (CDM).

Accordingly, the first data and the second data may in particular be conveyed in parallel (in a same time unit) or in different time units.

In an embodiment, the first DSL system and the second DSL system each is one of the following:
 an ADSL system;
 a VDSL system;
 a vectored xDSL system;
 a G.fast system;
 a G.hn system.

It is noted that the first DSL system and the second DSL system may be of the same type of DSL system or of different types of DSL systems.

It is further noted that xDSL may refer to any DSL system. The VDSL system comprises also VDSL-alike systems, e.g., VDSL2. Also, different profiles may be used for each of the (x)DSL systems, e.g., VDSL2 profile 17a, VDSL profile 30a, etc. It is further noted that the examples described herein may in particular use vectored systems.

In an embodiment, the first data and the second data are conveyed across the line after the first DSL system and the second DSL system entered showtime.

Hence, the first and the second DSL system may both be in showtime when the first and second data are conveyed across the line.

In an embodiment, the first data comprises handshake information and/or the second data comprises handshake information.

In an embodiment, the handshake information of the first DSL system and the handshake information of the second DSL system are conveyed via the first DSL, the second DSL system or via a third DSL system.

In an embodiment, a handshake process of the first DSL technology is conducted prior to a handshake process of the second DSL technology.

This beneficially allows reducing detrimental effects that stem from potential interference issues of handshake processes of different DSL technologies. The handshakes may be conducted in sequence or, in other words, one DSL system may be silent (on the relevant handshake frequencies) when the other DSL system needs to conduct its handshake.

In an embodiment, the first DSL system and the second DSL system are connected via a diplexer to the line.

In an embodiment, the diplexer comprises a first filter for the first DSL system and a second filter for the second DSL system.

In an embodiment, each DSL system provides data services.

Hence, each DSL system may be used for conveying data services without any voice service.

In an embodiment, each DSL system is a multi-carrier system, in particular a multi-carrier system utilizing discrete multi-tone modulation.

In an embodiment, the several DSL systems utilize different frequency bands.

The several DSL systems may at least partially use different frequency bands. As an option, at least two out of several (more than two) DSL systems may use (at least partially) different frequency bands. The frequency band may be a continuous frequency band or it may comprise a frequency band with gaps.

In an embodiment, the first data and the second data are conveyed across the line by an integrated service.

Such integrated service may supply a combined data rate utilizing the first DSL system and the second DSL system in a transparent manner. Hence, a user may subscribe to such a service which may then be (e.g., by a provider) distributed among several DSL systems as an integrated service.

A filtering unit is provided, which comprises
 a first filter that is arranged for conveying first data via a first DSL system across a line;
 a second filter that is arranged for conveying second data via a second DSL system across the line.

In an embodiment,
 said first filter is arranged for conveying the first data from the first DSL system via the line or from the line to the first DSL system;
 said second filter is arranged for conveying the second data from the second DSL system via the line or from the line to the second DSL system.

In an embodiment, the filtering unit is part of a diplexer.
In an embodiment, the diplexer is part of a network element.

In an embodiment, the first filter and the second filter are each a higher order filter.

A device is suggested, said device comprising
 a first DSL system;
 a second DSL system;
 a processing unit that is arranged for
  conveying first data via the first DSL system across a line;
  conveying second data via the second DSL system across the line.

It is noted that the steps of the method stated herein may be executable on this processing unit or device as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

In an embodiment, the device is a network element, in particular a de-centrally deployed device, in particular a customer premises equipment, or a central device, in particular a digital subscriber line access multiplexer.

In an embodiment, the first DSL system and the second DSL system utilize separate frequency bands.

In an embodiment, the first DSL system and the second DSL system utilize the same frequency band.

In an embodiment, the processing unit is arranged for conveying a handshake information of the second system via the first DSL system.

In an embodiment, the processing unit is arranged for conveying a handshake information of the second system via a third DSL system.

A system is provided, said system comprising two devices as described herein, wherein the system is arranged to convey first data between the first DSL systems of the two devices and to convey data between the second DSL systems of the two devices across a single line.

Also, a device for data processing in a digital subscriber line environment is suggested, said device comprising
 means for conveying first data via a first DSL system across a line;

means for conveying second data via a second DSL system across the line.

A computer program product is provided, which is directly loadable into a memory of a digital processing device, comprising software code portions for performing the steps of one of the methods as described herein.

In addition, the problem stated above is solved by a computer-readable medium, e.g., storage of any kind, having computer-executable instructions adapted to cause a computer system to perform the method as described herein.

Furthermore, the problem stated above is solved by a communication system comprising at least one device as described herein.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted, or elements from any embodiment and be used in various combinations with other embodiments disclosed. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

ADSL Asynchronous Digital Subscriber Line
AFE Analog Front-End
ASIC Application-Specific Integrated Circuit
ATM Asynchronous Transfer Mode
BAT Bit Allocation Table
BPF Band pass filter
CO Central Office
CPE Customer Premises Equipment
DMT Discrete Multi-Tone
DSL Digital Subscriber Line
DSLAM DSL Access Multiplexer
DSP Digital Signal Processor
FPGA Field Programmable Gate Array
HF High Frequency
HPF High pass filter
LD Line Driver
LF Low Frequency
LPF Low pass filter
OFDM Orthogonal frequency-division multiplexing
PTM Packet Transfer Mode
RX Receiver
SLV System Level Vectoring
VCE Vectoring Control Entity
VDSL Very High Speed Digital Subscriber Line
VP Vectoring Processor

The invention claimed is:

1. A device comprising:
a first digital subscriber line (DSL) system configured to transmit digital data in a first frequency band during a showtime;
a second DSL system configured to transmit digital data in a second frequency band during the showtime; and a filter unit connected to a line and to each of the first DSL system and the second DSL system, wherein the filter unit is configured to enable transmission of handshake tones of the second DSL system at frequencies below the second frequency band while the first DSL system is in the showtime.

2. The device according to claim 1, wherein said device is a digital subscriber line access multiplexer.

3. The device according to claim 1, wherein the first DSL system is a vectored DSL system.

4. The device according to claim 3, wherein:
the second DSL system is a vectored DSL system; and
the first DSL system and the second DSL system simultaneously transmit digital data over a same twisted pair.

5. The device according to claim 1, wherein:
the second frequency band is not overlapping with the first frequency band;
the filter unit comprises:
a low pass filter and a high pass filter that are each connected to a transceiver of the second DSL system; and
a band pass filter that is connected to a transceiver of the first DSL system and has a passband that is between a cutoff frequency of the low pass filter and a cutoff frequency of the high pass filter; and
the second DSL system is configured to transmit handshake tones through the low pass filter during initialization.

6. The device according to claim 1, further comprising a bonding unit for receiving and transmitting packets and connected to each of the first DSL system and the second DSL system.

7. The device according to claim 6, wherein the bonding unit is arranged to distribute packets onto at least two channels, wherein each DSL system provides at least one channel.

8. The device according to claim 1, wherein the filter unit comprises a diplexer.

9. The device according to claim 1, wherein the filter unit comprises at least one filter, which combines signals from the first DSL system and the second DSL system onto the line and separates signals for the first DSL system and the second DSL system.

10. The device according to claim 1, wherein the line comprises a copper line cable, an aluminum cable or an electrical wire.

11. A method comprising:
conveying, by a first digital subscriber line (DSL) system that is connected to a line, first digital data in a first frequency band during a showtime;
transmitting, by a second DSL system that is connected to the line and through a filter unit, handshake tones of the second DSL system at frequencies below a second frequency band at which the second DSL system transmits digital data during the showtime;
and conveying, by the second DSL system that is connected to the line, second data in the second frequency band during the showtime.

12. The method according to claim 11, further comprising conveying additional data via at least one additional DSL system across the line.

13. The method according to claim 11, wherein the first data and the second data are multiplexed across the line.

14. The method according to claim 11, wherein the first DSL system and the second DSL system each is one of the following:
an ADSL system;
a VDSL system;

a vectored xDSL system;
a G.fast system; or
a G.hn system.

15. The method according to claim 11, wherein the first data and the second data are conveyed across the line after the first DSL system and the second DSL system entered showtime.

16. The method according to claim 11, wherein a handshake process of the first DSL technology is conducted prior to a handshake process of the second DSL technology.

17. The method according to claim 11, wherein the first DSL system and the second DSL system are connected via a diplexer to the line.

18. The method according to claim 17, wherein the diplexer comprises a first filter for the first DSL system and a second filter for the second DSL system, wherein the second filter comprises both a high pass filter and a low pass filter and the first filter comprises a band pass filter having a passband that is between a cutoff frequency of the high pass filter and a cutoff frequency of the low pass filter.

19. The method according to claim 11, wherein each DSL system provides data services.

20. The method according to claim 11, wherein each DSL system is a multi-carrier system, in particular a multi-carrier system utilizing discrete multi-tone modulation.

21. The method according to claim 11, wherein the first data and the second data are conveyed across the line by an integrated service.

22. A filtering unit comprising:
a first filter that is arranged for conveying first data of a first digital subscriber line (DSL) system across a line and in a first frequency band during a showtime;
a second filter that is arranged for conveying second data of a second DSL system across the line and in a second frequency band during the showtime, wherein the second filter is further arranged to transmit handshake tones of the second DSL system at frequencies below the second frequency band while the first DSL system is in the showtime.

23. The filtering unit according to claim 22,
wherein said first filter is arranged for conveying the first data from the first DSL system via the line and from the line to the first DSL system;
wherein said second filter is arranged for conveying the second data from the second DSL system via the line and from the line to the second DSL system.

24. The filtering unit according to claim 22, wherein the filtering unit is part of a diplexer.

25. The filtering unit according to claim 24, wherein the diplexer is part of a network element.

26. The filtering unit according to claim 22, wherein:
the second filter comprises a low pass filter and a high pass filter that are each connected to a transceiver of the second DSL system;
the first filter is a band pass filter having a passband that is between a cutoff frequency of the low pass filter and a cutoff frequency of the high pass filter; and the first filter and the second filter are each a higher order filter.

27. A device comprising:
a first digital subscriber line (DSL) system that is connected to a line;
a second DSL system that is connected to the line;
a processing unit that is arranged for
conveying, via the first DSL system first digital data in a first frequency band during the showtime;
conveying, by via the second DSL system, second data in a second frequency band during the showtime;
and transmitting, during the showtime of the first DSL system and via the second DSL system, handshake tones of the second DSL system at frequencies below the second frequency band.

28. The device according to claim 27, wherein the device is a de-centrally deployed customer premises equipment, or a centralized digital subscriber line access multiplexer.

29. The device according to claim 27, wherein the first DSL system and the second DSL system utilize separate frequency bands during showtime.

30. The device according to claim 27, wherein the first DSL system and the second DSL system utilize the same frequency band during showtime.

31. The device according to claim 27, wherein the processing unit is arranged for conveying a handshake information of the second system via the first DSL system.

32. The device according to claim 27, wherein the processing unit is arranged for conveying a handshake information of the second system via a third DSL system.

33. A device for data processing in a digital subscriber line environment comprising:
means for conveying first digital data of a first digital subscriber line (DSL) system across a line during a showtime and in a first frequency band;
means for conveying second data of a second DSL system across the line and in a second frequency band during the showtime; and
means for transmitting handshake tones of the second DSL system at frequencies below the second frequency band while the first DSL system is in the showtime.

34. A computer program product stored in a non-transitory memory of a digital processing device, comprising software code portions for performing the steps of:
conveying, by a first digital subscriber line (DSL) system that is connected to a line, first digital data in a first frequency band during a showtime;
conveying, by a second DSL system that is connected to the line, second digital data in a second frequency band during the showtime;
and transmitting, by the second DSL system and during the showtime of the first DSL system, handshake tones of the second DSL system at frequencies below the second frequency band.

* * * * *